United States Patent
Ferner

(10) Patent No.: US 12,331,677 B2
(45) Date of Patent: Jun. 17, 2025

(54) MODIFIED ALLAM CYCLE SYSTEM AND METHOD FOR HYDROCARBON RECOVERY STEAM GENERATION

(71) Applicant: Cenovus Energy Inc., Calgary (CA)

(72) Inventor: Peter A. Ferner, Calgary (CA)

(*) Notice: Subject to any disclaimer, the term of this patent is extended or adjusted under 35 U.S.C. 154(b) by 0 days.

(21) Appl. No.: 18/535,734

(22) Filed: Dec. 11, 2023

(65) Prior Publication Data
US 2024/0200492 A1    Jun. 20, 2024

Related U.S. Application Data

(60) Provisional application No. 63/432,439, filed on Dec. 14, 2022.

(51) Int. Cl.
| | | |
|---|---|---|
| F02C 3/34 | (2006.01) | |
| E21B 43/24 | (2006.01) | |
| F02C 6/18 | (2006.01) | |

(52) U.S. Cl.
CPC ............... *F02C 3/34* (2013.01); *E21B 43/24* (2013.01); *F02C 6/18* (2013.01); F05D 2220/76 (2013.01)

(58) Field of Classification Search
CPC .......... F05D 2220/76; F02C 3/34; F02C 6/18; E21B 43/24
See application file for complete search history.

(56) References Cited

U.S. PATENT DOCUMENTS

| | | | | |
|---|---|---|---|---|
| 4,498,289 | A * | 2/1985 | Osgerby | F02C 6/003 60/647 |
| 6,581,684 | B2 * | 6/2003 | Wellington | E21B 43/247 166/267 |
| 8,596,075 | B2 * | 12/2013 | Allam | F02C 3/20 60/39.5 |
| 8,959,887 | B2 * | 2/2015 | Allam | F23R 3/005 60/39.5 |
| 9,523,312 | B2 * | 12/2016 | Allam | F25J 3/04018 |
| 9,784,140 | B2 * | 10/2017 | Huntington | F01K 13/00 |
| 10,018,115 | B2 * | 7/2018 | Allam | F25J 3/04018 |
| 11,255,223 | B2 * | 2/2022 | Akhtar | F02C 1/007 |
| 2012/0159954 | A1 * | 6/2012 | Ito | F01D 9/023 60/752 |
| 2013/0118145 | A1 * | 5/2013 | Palmer | F03G 6/064 60/641.14 |
| 2015/0082795 | A1 * | 3/2015 | Fadde | F23R 3/002 60/734 |
| 2022/0340822 | A1 * | 10/2022 | Rooney | C10G 9/20 |

(Continued)

OTHER PUBLICATIONS

"Net Power's First Allam Cycle 300-MW Gas-Fired Project Will Be Built in Texas"; Sonia Patel, Nov. 10, 2022; available at https://www.powermag.com/net-powers-first-allam-cycle-300-mw-gas-fired-project-will-be-built-in-texas/.

(Continued)

*Primary Examiner* — Jesse S Bogue

(57) ABSTRACT

A system and method for generating power and steam for a hydrocarbon recovery operation, in which a fuel gas and oxygen are combusted in a carbon dioxide working fluid in at least one combustor, the combustion products driving a turbine to generate power, and extracting heat from the turbine output stream, part of the heat used for heating the carbon dioxide working fluid before the combustion stage and part of the heat used for heating a feedwater to generate steam.

18 Claims, 5 Drawing Sheets

(56) References Cited

U.S. PATENT DOCUMENTS

2023/0340914 A1* 10/2023 Callahan .................. F02C 3/22
2024/0200492 A1*  6/2024 Ferner ...................... F02C 3/34

OTHER PUBLICATIONS

"Preliminary Cost and Performance Results for a Natural Gas-Fired Direct SCO2 Power Plant"; Charles White et al.; The Sixth International Supercritical CO2 Power Cycles Symposium, Mar. 27-29, 2018.
U.S. Appl. No. 63/432,439, filed Dec. 14, 2022; Ferner.

* cited by examiner

MODIFIED ALLAM CYCLE SYSTEM AND METHOD FOR HYDROCARBON RECOVERY STEAM GENERATION

CROSS-REFERENCE TO RELATED APPLICATION(S)

The present disclosure claims priority from U.S. Provisional Appl. No. 63/432,439, filed on Dec. 14, 2022, entitled "MODIFIED ALLAM CYCLE SYSTEM AND METHOD FOR HYDROCARBON RECOVERY STEAM GENERATION," herein incorporated by reference in its entirety.

BACKGROUND

1. Field

The present disclosure relates to hydrocarbon recovery systems, and more particularly to steam generation for thermal hydrocarbon recovery systems.

2. Related Art

In the art of hydrocarbon recovery systems, it is known to employ thermal recovery techniques where for example the resource is a heavy hydrocarbon such as bitumen that cannot be produced using conventional recovery methods developed for lighter, more mobile and more easily-produced hydrocarbons.

In order to mobilize heavy hydrocarbon, known techniques such as Steam-Assisted Gravity Drainage (SAGD) and Cyclic Steam Stimulation (CSS) inject steam (with or without solvent or other additives) into a subsurface reservoir in order to heat and mobilize the hydrocarbon. The mobilized hydrocarbon is either pumped back up the same well as was used for steam injection (as in CSS), or drains due to gravity from around and above an injection well to an underlying production well (as in SAGD) for production to the surface.

Such systems thus require the production of steam, and it is known that large volumes of steam must be produced on a continuous basis to support large-scale recovery operations, requiring substantial input energy. In addition, such thermal recovery operations require electrical power for facilities but are often in remote regions with little to no electricity infrastructure.

It is known in the art of power generation to employ what is known as an "Allam cycle", where in one conventional design a $CO_2$ stream is circulated between a single natural-gas-fueled combustor, a turbine and heat recuperators. However, the conventional Allam cycle is optimized for power generation, with a high-temperature recuperator directly receiving a heated fluid from the turbine and using that heated fluid to pre-heat the $CO_2$ stream before introduction to the single combustor. To increase the heat of the $CO_2$ stream to a target temperature before introduction to the turbine, most of the necessary heat energy is extracted from the $CO_2$ stream itself through one or more heat recuperators, with the single combustor positioned between the heat recuperators and the turbine to top up the stream heat. Given this optimized design, there is no excess heat available for other uses such as steam generation.

What is needed, therefore, is a way to modify a conventional Allam cycle to also generate steam for use in hydrocarbon recovery systems.

SUMMARY

According to a first broad aspect of the present disclosure, there is provided a system for generating power and steam for a hydrocarbon recovery operation, the system comprising:
  at least one combustor configured to combust a fuel gas and oxygen in a carbon dioxide working fluid to generate combustion products comprising the carbon dioxide working fluid and water;
  a fuel gas supply subsystem configured to supply the fuel gas to the at least one combustor;
  an oxygen supply subsystem configured to supply the oxygen to the at least one combustor;
  a turbine configured to receive the combustion products from the at least one combustor to generate the power and a turbine output stream;
  at least one first recuperator configured to receive the turbine output stream and extract first heat therefrom to form a first recuperator output stream;
  at least one second recuperator configured to receive the first recuperator output stream and extract second heat therefrom to form a second recuperator output stream;
  a water extractor for receiving the second recuperator output stream to extract the water therefrom leaving the carbon dioxide working fluid; and
  a first compressor for receiving the carbon dioxide working fluid from the water extractor and compressing the carbon dioxide working fluid;
  wherein the at least one second recuperator is configured to receive the carbon dioxide working fluid from the first compressor for heating thereof using the second heat to heat the carbon dioxide working fluid for supply to the at least one combustor; and
  wherein the at least one first recuperator is configured to receive a feedwater from a feedwater supply subsystem for heating thereof using the first heat to generate the steam from the feedwater.

In some exemplary embodiments of the first broad aspect, the at least one combustor is two combustors arranged either in series or in parallel. The fuel gas is preferably natural gas, although those skilled in the art will know of other suitable fuels. Some exemplary systems have an oxygen supply subsystem comprising an air supply, an air compressor for compressing air received from the air supply to form compressed air, an air separation unit for receiving the compressed air to extract oxygen therefrom, and an oxygen compressor for compressing the oxygen for supply to the at least one combustor.

The at least one second recuperator is preferably two recuperators arranged in series, wherein at least one of the two recuperators is further configured to heat the oxygen before supply to the at least one combustor.

The water extractor preferably further cools the carbon dioxide working fluid while extracting the water.

A portion of the carbon dioxide working fluid may be redirected from the first compressor for mixing downstream of the at least one second recuperator with the oxygen before supply thereof to the at least one combustor. Alternatively, a portion of the carbon dioxide working fluid may be redirected from the first compressor for mixing upstream of the at least one second recuperator with the oxygen before supply thereof to the at least one combustor thereby pre-heating the oxygen with the second heat.

According to a second broad aspect of the present disclosure, there is provided a method for generating power and steam for a hydrocarbon recovery operation, the method comprising the steps of:
a. providing a fuel gas and oxygen;
b. providing a carbon dioxide working fluid;
c. combusting the fuel gas and the oxygen in the carbon dioxide working fluid in at least one combustor to generate combustion products comprising the carbon dioxide working fluid and water;
d. using a turbine to generate the power from the combustion products;
e. extracting first heat from a turbine output stream;
f. extracting second heat from the turbine output stream;
g. extracting the water from the turbine output stream leaving the carbon dioxide working fluid;
h. compressing the carbon dioxide working fluid after extraction of the water and heating the carbon dioxide working fluid with the second heat for use in combustion of the fuel and the oxygen in the at least one combustor; and
i. heating a feedwater with the first heat to generate the steam from the feedwater.

Some exemplary methods comprise at least two combustors and arranging the at least two combustors in series or in parallel.

The step of providing the oxygen may further comprise compressing air to form compressed air, extracting the oxygen from the compressed air, and compressing the oxygen before providing the oxygen to the at least one combustor.

A first recuperator may be used for the step of extracting the first heat and a second recuperator may be used for the step of extracting the second heat, the first and second recuperators arranged in series.

At least one of the first and second recuperators may be used to heat the oxygen before combustion in the at least one combustor.

The carbon dioxide working fluid is preferably cooled as the water is extracted.

In some exemplary embodiments, after the compressing and heating of the carbon dioxide working fluid, methods may comprise redirecting a portion of the carbon dioxide working fluid and mixing the carbon dioxide working fluid with the oxygen before combustion by the at least one combustor. Alternatively in some exemplary embodiments, after the compressing of the carbon dioxide working fluid, methods may comprise redirecting a portion of the carbon dioxide working fluid and mixing the carbon dioxide working fluid with the oxygen, and heating the carbon dioxide working fluid and the oxygen, before combustion by the at least one combustor.

A detailed description of exemplary embodiments of the present disclosure is given in the following. It is to be understood, however, that the present invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE DRAWINGS

The accompanying drawings illustrate exemplary embodiments of the present disclosure and include the following.

Exemplary embodiments will now be described with reference to the accompanying drawings.

DETAILED DESCRIPTION OF EXEMPLARY EMBODIMENTS

Throughout the following description, specific details are set forth in order to provide a more thorough understanding to persons skilled in the art. However, well known elements may not have been shown or described in detail to avoid unnecessarily obscuring the disclosure. The following description of examples of the present disclosure is not intended to be exhaustive or to limit the present invention to the precise form of any exemplary embodiment. Accordingly, the description and drawings are to be regarded in an illustrative, rather than a restrictive, sense.

Figure 1:
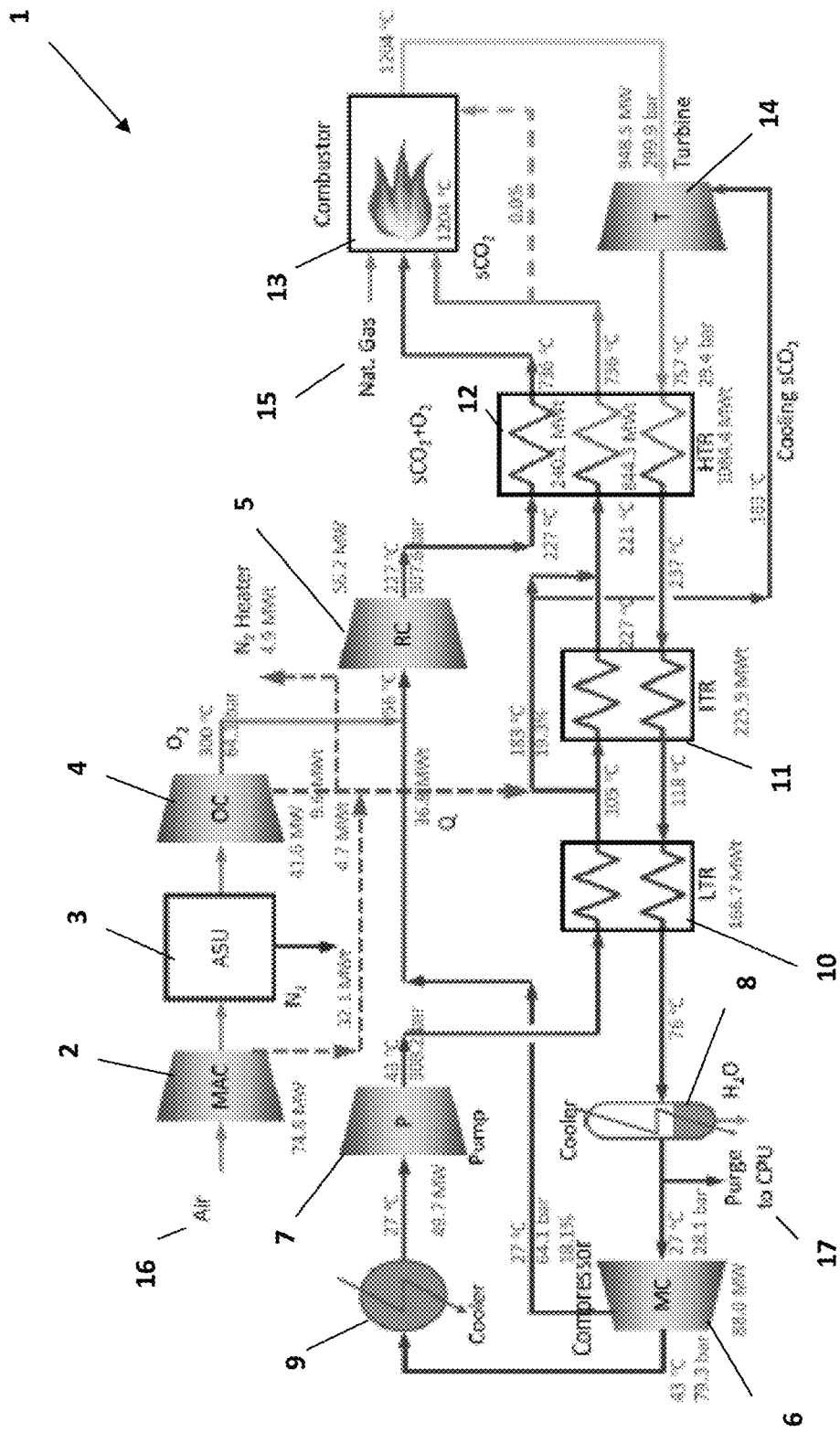
FIG. 1 is a prior art Allam cycle for a natural gas-fired $CO_2$ fluid cycle power plant.

FIG. 1 illustrates a prior art system 1 employing a conventional Allam cycle. The system 1 comprises a main air compressor 2 which receives air from an air supply 16, the compressed air being directed to an air separation unit 3 to extract oxygen and reject other parts of the compressed air stream such as nitrogen. The oxygen stream is then directed to an oxygen compressor 4 before being introduced to a $CO_2$ stream. The combined oxygen and $CO_2$ stream passes through a recycle compressor 5, resulting in a $CO_2$ and oxygen feed stream that passes through a high-temperature recuperator 12 (essentially a heat exchange vehicle) on the way to a combustor 13. As is shown, the combined $CO_2$ and oxygen stream is pre-heated in the high-temperature recuperator 12, and then the pre-heated stream is introduced to the combustor 13 where the stream is combusted in the presence of natural gas which is received from a natural gas supply 15. The combustion product stream, comprising primarily the $CO_2$ and water, passes to a turbine 14 which thereby generates electricity. The turbine 14 also produces a lowered-temperature output comprising the combustion product stream, which passes through the high-temperature recuperator 12. The high-temperature recuperator 12 captures some of the heat from the turbine output, and intermediate-temperature and low-temperature recuperators 11, 10 subsequently extract additional heat from the output stream. Water is then extracted from the stream using a cooler 8, with some purging to a $CO_2$ processing unit 17, leaving the remaining $CO_2$ stream to pass through a main compressor 6 and undergo further cooling in a cooler 9 before being driven by a pump 7 back into the low-temperature, intermediate-temperature and high-temperature recuperators 10, 11, 12 in series to be pre-heated before reintroduction to the combustor 13.

As can be seen from FIG. 1, to increase the heat of the $CO_2$ stream to the target temperature of 1204 degrees C. (in this illustrated embodiment) before introduction to the turbine 14, most of the necessary heat energy is extracted from the $CO_2$ stream itself through the recuperators 10, 11, 12, with the single combustor 13 positioned between the recuperators 10, 11, 12 and the turbine 14 to top up the stream heat. Given this optimized design, there is no excess heat available for other uses such as steam generation.

Turning now to FIGS. 2 to 5, exemplary embodiments according to the present disclosure are illustrated. A key feature of the exemplary embodiments is the way in which the $CO_2$ stream is pre-heated before introduction to the combustion stage so that the stream can be at the target temperature before introduction to the turbine. In the traditional prior art Allam cycle (as illustrated in FIG. 1) most of the heat is coming from heat recovery from the $CO_2$ stream itself using the recuperators, with a top-up heating from the single combustor. There is therefore no heat available for any other purpose such as steam generation. In contrast, the illustrated exemplary embodiments show the presence of an additional combustor which can provide extra heat and change the heat recovery scheme. It is to be noted, however, that some embodiments in accordance with the present disclosure may employ a single combustor that generates more heat than what the turbine is configured to convert to electricity (which the skilled person would not implement for the Allam cycle which is optimized for electricity generation), and therefore the use of multiple smaller combustors is merely exemplary and not limiting as to the scope of the present disclosure. In the illustrated embodiments, part of the hot low-pressure $CO_2$ stream exiting the turbine is instead used for steam generation at a high-temperature recuperator, with the additional combustor on the high-pressure side of the system introducing the extra heat required by the system to get the turbine feed stream to the necessary temperature and allow generation of both electricity and steam by the system as a whole.

Figure 2:
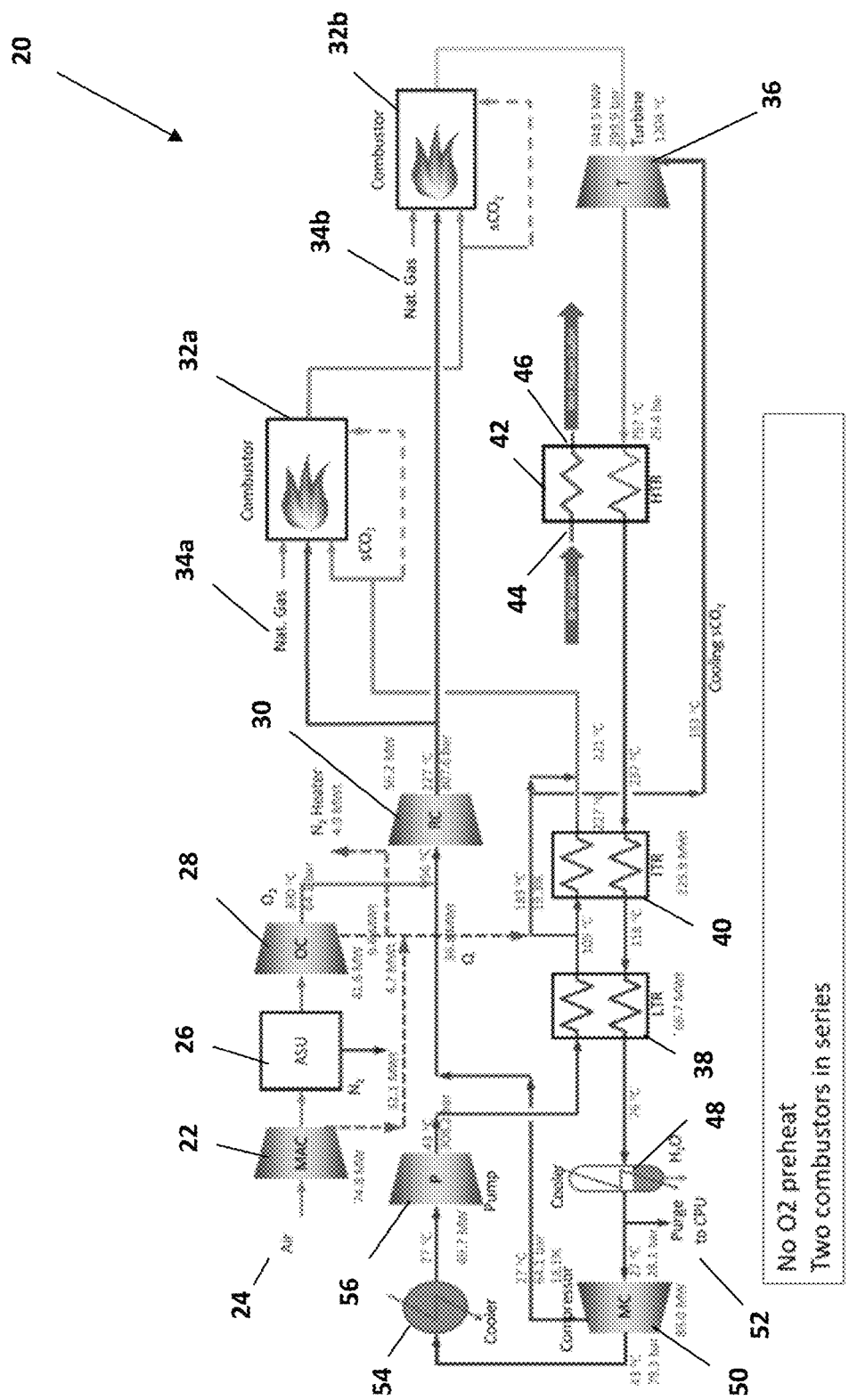
FIG. 2 is a simplified schematic of a first embodiment of the present disclosure, with two combustors in series and no oxygen pre-heating.

FIG. 2 illustrates a system 20 for generating both electricity and steam, such as might be useful for a thermal hydrocarbon recovery operation. The system 20 involves no pre-heating of the combined $CO_2$ and oxygen stream in a high-temperature recuperator 42 before combustion, and the system 20 has first and second combustors 32a, 32b in series. In the system 20, air from an air supply 24 is introduced to a main air compressor 22, the compressed air passing to an air separation unit 26 to extract oxygen and reject other components such as nitrogen. The extracted oxygen passes through an oxygen compressor 28 and the compressed oxygen is then introduced to a circulating $CO_2$ stream before introduction to a recycle compressor 30, which circulating $CO_2$ stream is received by the recycle compressor 30 from a main compressor 50. The compressed $CO_2$ and oxygen stream is then sent from the recycle compressor 30 to the first and second combustors 32a, 32b for combustion in the presence of natural gas from natural gas supplies 34a, 34b, respectively. The combustion product from the first and second combustors 32a, 32b is a stream comprising $CO_2$ and water, which is now at the target temperature of 1204 degrees C. and can be introduced to a turbine 36 which generates electricity. The output stream from the turbine 36, which is now at reduced pressure and temperature, passes in series through the high-temperature recuperator 42 and intermediate-temperature and low-temperature recuperators 40, 38, with each of the recuperators 42, 40, 38 extracting heat therefrom.

Heat extracted at the high-temperature recuperator 42 is made available to generate steam, acting effectively as a boiler and potentially replacing once-through steam generators conventionally used at thermal hydrocarbon recovery operations. A boiler feedwater is introduced to the high-temperature recuperator 42 at a boiler feedwater inlet 44, the feedwater being heated by the extracted heat in the high-temperature recuperator 42 and converted to wet steam which is removed from the high-temperature recuperator 42 by a wet steam outlet 46. This steam can then be directed as necessary for use in thermal hydrocarbon recovery such as injection downhole to the target resource.

After passing through the recuperators 42, 40, 38, the reduced-heat $CO_2$ and water stream is cooled at a cooler 48 to remove water from the stream, with some purging to a $CO_2$ processing unit 52 before the remaining $CO_2$ stream goes to the main compressor 50. As can be seen, the main compressor 50 generates two $CO_2$ streams, one which goes to the recycle compressor 30 for blending with oxygen before combustion, and the other which returns after cooling at a cooler 54 to the low-temperature and intermediate-temperature recuperators 38, 40 in series by a pump 56 before introduction (with or without oxygen) to the combustors 32a, 32b as described above.

Figure 3:
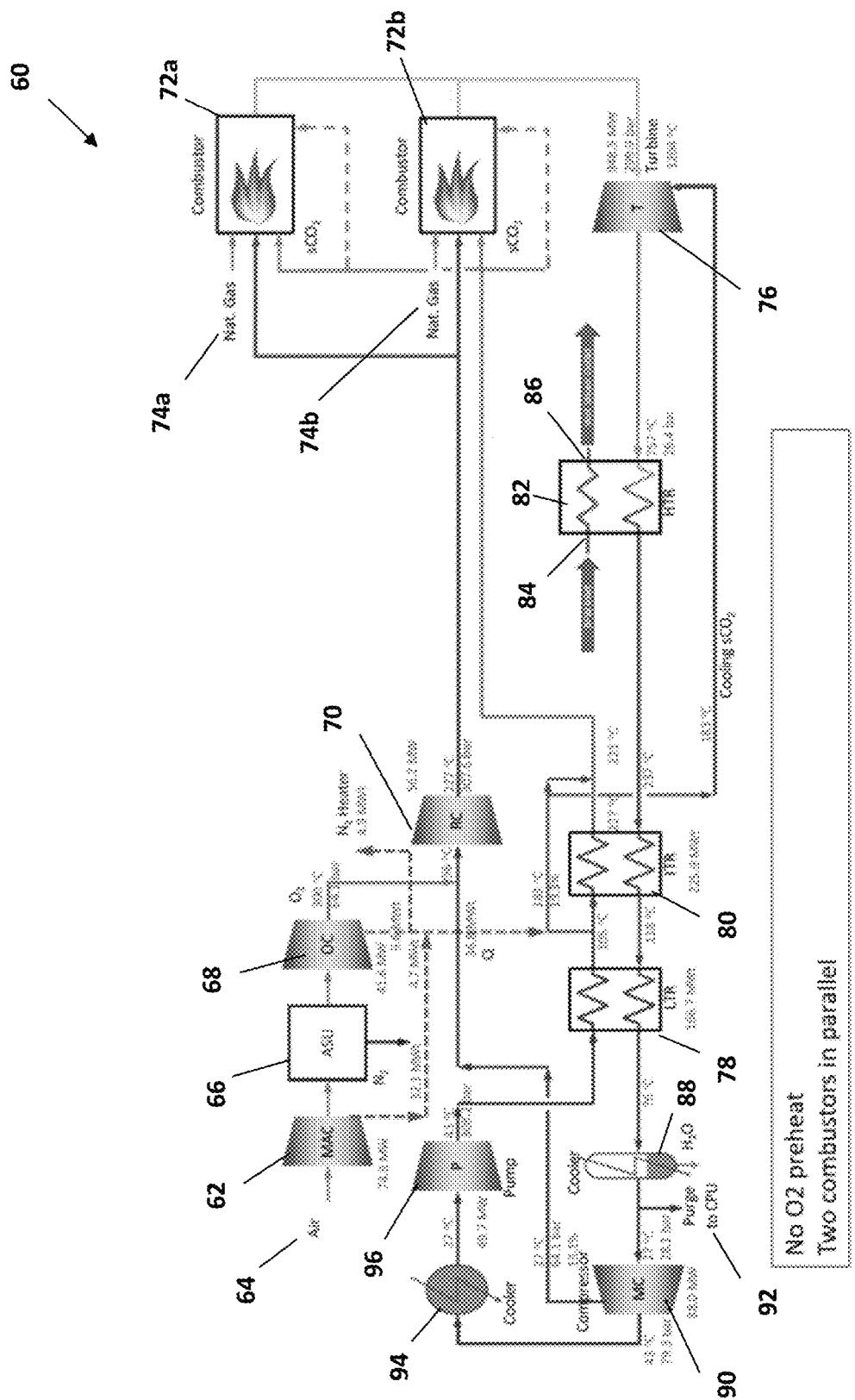
FIG. 3 is a simplified schematic of a second embodiment of the present disclosure, with two combustors in parallel and no oxygen pre-heating.

Turning now to FIG. 3, a system 60 is illustrated for generating both electricity and steam, such as might be useful for a thermal hydrocarbon recovery operation, again with no pre-heating of the combined $CO_2$ and oxygen stream in a high-temperature recuperator 82 before combustion. Unlike the exemplary embodiment illustrated in FIG. 2, the system 60 has first and second combustors 72a, 72b arranged in parallel rather than in series. In the system 60, air from an air supply 64 is introduced to a main air compressor 62, the compressed air passing to an air separation unit 66 to extract oxygen and reject other components such as nitrogen. The extracted oxygen passes through an oxygen compressor 68 and the compressed oxygen is then introduced to a circulating $CO_2$ stream before introduction to a recycle compressor 70, which circulating $CO_2$ stream is received by the recycle compressor 70 from a main compressor 90. The compressed $CO_2$ and oxygen stream is then sent from the recycle compressor 70 directly to each of the first and second combustors 72a, 72b for combustion in the presence of natural gas from natural gas supplies 74a, 74b, respectively. The combustion product collected from each of the first and second combustors 72a, 72b is a stream comprising $CO_2$ and water, which is now at the target temperature of 1204 degrees C. and can be introduced to a turbine 76 which generates electricity. The output stream from the turbine 76, which is now at reduced pressure and temperature, passes in series through the high-temperature recuperator 82 and intermediate-temperature and low-temperature recuperators 80, 78, with each of the recuperators 82, 80, 78 extracting heat therefrom.

Heat extracted at the high-temperature recuperator 82 is made available to generate steam, acting effectively as a boiler and potentially replacing once-through steam generators conventionally used at thermal hydrocarbon recovery operations. A boiler feedwater is introduced to the high-temperature recuperator 82 at a boiler feedwater inlet 84, the feedwater being heated by the extracted heat in the high-temperature recuperator 82 and converted to wet steam which is removed from the high-temperature recuperator 82 by a wet steam outlet 86. This steam can then be directed as necessary for use in thermal hydrocarbon recovery such as injection downhole to the target resource.

After passing through the recuperators 82, 80, 78, the reduced-heat $CO_2$ and water stream is cooled at a cooler 88 to remove water from the stream, with some purging to a $CO_2$ processing unit 92 before the remaining $CO_2$ stream goes to the main compressor 90. As can be seen, the main compressor 90 generates two $CO_2$ streams, one which goes to the recycle compressor 70 for blending with oxygen before combustion, and the other which returns after cooling at a cooler 94 to the low-temperature and intermediate-temperature recuperators 78, 80 in series by a pump 96 before introduction (with or without oxygen) to the combustors 72a, 72b as described above.

Figure 4:
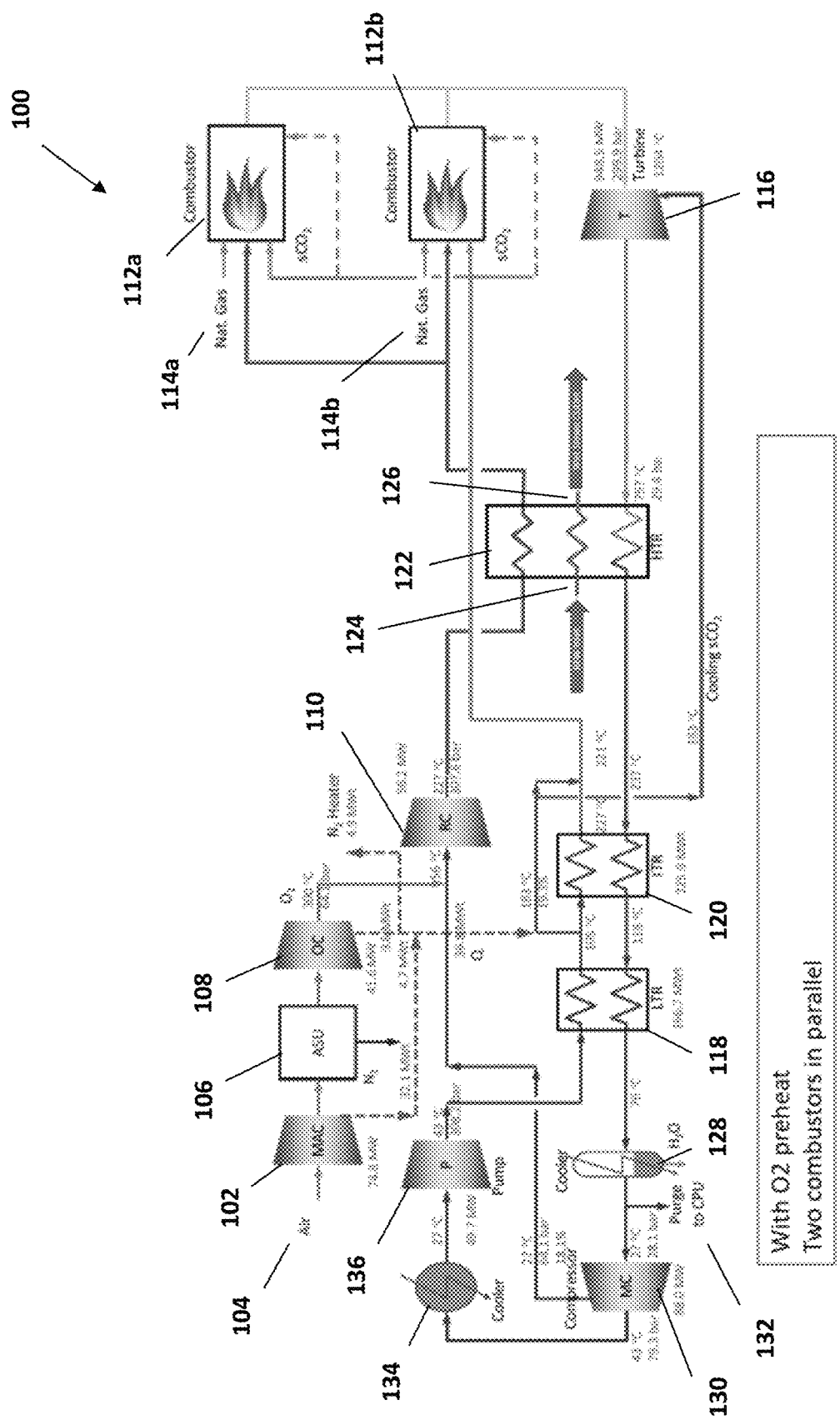
FIG. 4 is a simplified schematic of a third embodiment of the present disclosure, with two combustors in parallel and with oxygen pre-heating.
Figure 5:
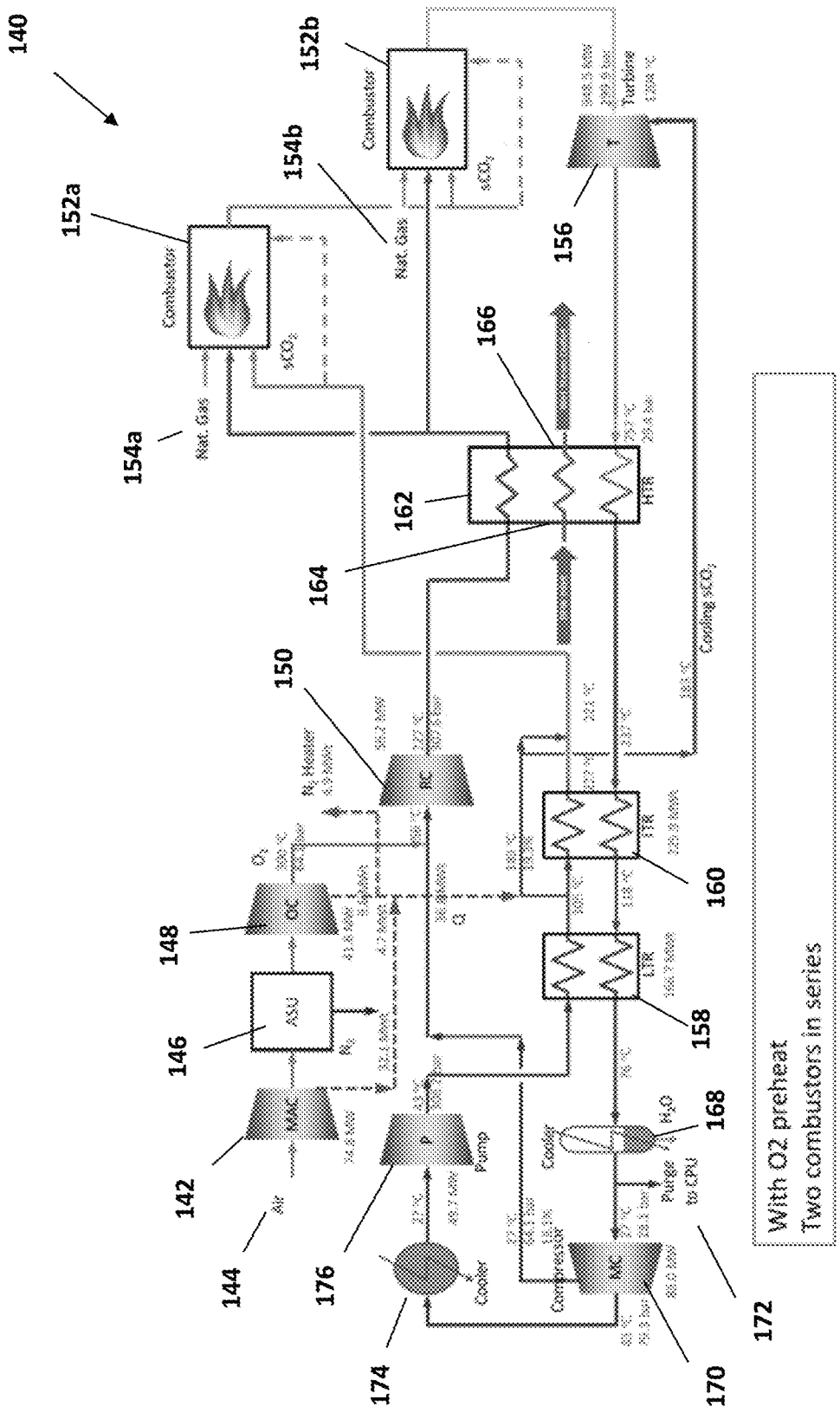
FIG. 5 is a simplified schematic of a fourth embodiment of the present disclosure, with two combustors in series and with oxygen pre-heating.

Turning now to FIGS. 4 and 5, the illustrated embodiments show that heat extracted at the high-temperature recuperator is used to both generate steam and help pre-heat the combined $CO_2$ and oxygen stream before combustion.

FIG. 4 illustrates a system 100 for generating both electricity and steam, such as might be useful for a thermal hydrocarbon recovery operation, with pre-heating of the combined $CO_2$ and oxygen stream in a high-temperature recuperator 122 before combustion. Like the exemplary embodiment illustrated in FIG. 3, the system 100 has first and second combustors 112a, 112b arranged in parallel rather than in series. In the system 100, air from an air supply 104 is introduced to a main air compressor 102, the compressed air passing to an air separation unit 106 to extract oxygen and reject other components such as nitrogen. The extracted oxygen passes through an oxygen compressor 108 and the compressed oxygen is then introduced to a circulating $CO_2$ stream before introduction to a recycle compressor 110, which circulating $CO_2$ stream is received by the recycle compressor 110 from a main compressor 130. The compressed $CO_2$ and oxygen stream is then sent from the recycle compressor 110 directly to each of the first and second combustors 112a, 112b for combustion in the presence of natural gas from natural gas supplies 114a, 114b, respectively. The combustion product collected from each of the first and second combustors 112a, 112b is a stream comprising $CO_2$ and water, which is now at the target temperature of 1204 degrees C. and can be introduced to a turbine 116 which generates electricity. The output stream from the turbine 116, which is now at reduced pressure and temperature, passes in series through the high-temperature recuperator 122 and intermediate-temperature and low-temperature recuperators 120, 118, with each of the recuperators 122, 120, 118 extracting heat therefrom.

Part of the heat extracted at the high-temperature recuperator 122 is made available to generate steam, acting effectively as a boiler and potentially replacing once-through steam generators conventionally used at thermal hydrocarbon recovery operations. A boiler feedwater is introduced to the high-temperature recuperator 122 at a boiler feedwater inlet 124, the feedwater being heated by the extracted heat in the high-temperature recuperator 122 and converted to wet steam which is removed from the high-temperature recuperator 122 by a wet steam outlet 126. This steam can then be directed as necessary for use in thermal hydrocarbon recovery such as injection downhole to the target resource. Further, as noted above, part of the heat extracted at the high-temperature recuperator 122 is made available to help pre-heat the $CO_2$ and oxygen stream before introduction of the stream to each of the first and second combustors 112a, 112b.

After passing through the recuperators 122, 120, 118, the reduced-heat $CO_2$ and water stream is cooled at a cooler 128 to remove water from the stream, with some purging to a $CO_2$ processing unit 132 before the remaining $CO_2$ stream goes to the main compressor 130. As can be seen, the main compressor 130 generates two $CO_2$ streams, one which goes to the recycle compressor 110 for blending with oxygen before combustion, and the other which returns after cooling at a cooler 134 to the low-temperature and intermediate-temperature recuperators 118, 120 in series by a pump 136 before introduction (with or without oxygen) to the combustors 112a, 112b as described above.

FIG. 5 illustrates a system 140 for generating both electricity and steam, such as might be useful for a thermal hydrocarbon recovery operation, with pre-heating of the combined $CO_2$ and oxygen stream in a high-temperature recuperator 162 before combustion. Like the exemplary embodiment illustrated in FIG. 2, the system 140 has first and second combustors 152a, 152b arranged in series rather than in parallel. In the system 140, air from an air supply 144 is introduced to a main air compressor 142, the compressed air passing to an air separation unit 146 to extract oxygen and reject other components such as nitrogen. The extracted oxygen passes through an oxygen compressor 148 and the compressed oxygen is then introduced to a circulating $CO_2$ stream before introduction to a recycle compressor 150, which circulating $CO_2$ stream is received by the recycle compressor 150 from a main compressor 170. The compressed $CO_2$ and oxygen stream is then sent from the recycle compressor 150 to the first and second combustors 152a, 152b for combustion in the presence of natural gas from natural gas supplies 154a, 154b, respectively. The combustion product from the first and second combustors 152a, 152b is a stream comprising $CO_2$ and water, which is now at the target temperature of 1204 degrees C. and can be introduced to a turbine 156 which generates electricity. The output stream from the turbine 156, which is now at reduced pressure and temperature, passes in series through the high-temperature recuperator 162 and intermediate-temperature and low-temperature recuperators 160, 158, with each of the recuperators 162, 160, 158 extracting heat therefrom.

Part of the heat extracted at the high-temperature recuperator 162 is made available to generate steam, acting effectively as a boiler and potentially replacing once-through steam generators conventionally used at thermal hydrocarbon recovery operations. A boiler feedwater is introduced to the high-temperature recuperator 162 at a boiler feedwater inlet 164, the feedwater being heated by the extracted heat in the high-temperature recuperator 162 and converted to wet steam which is removed from the high-temperature recuperator 162 by a wet steam outlet 166. This steam can then be directed as necessary for use in thermal hydrocarbon recovery such as injection downhole to the target resource. Further, as noted above, part of the heat extracted at the high-temperature recuperator 162 is made available to help pre-heat the $CO_2$ and oxygen stream before introduction of the stream to the first and second combustors 152a, 152b.

After passing through the recuperators 162, 160, 158, the reduced-heat $CO_2$ and water stream is cooled at a cooler 168 to remove water from the stream, with some purging to a $CO_2$ processing unit 172 before the remaining $CO_2$ stream goes to the main compressor 170. As can be seen, the main compressor 170 generates two $CO_2$ streams, one which goes to the recycle compressor 150 for blending with oxygen before pre-heating and combustion, and the other which returns after cooling at a cooler 174 to the low-temperature and intermediate-temperature recuperators 158, 160 in series by a pump 176 before introduction (with or without oxygen) to the combustors 152a, 152b as described above.

The foregoing is considered as illustrative only of the principles of the present invention. The scope of the claims should not be limited by the exemplary embodiments set forth in the foregoing, but should be given the broadest interpretation consistent with the specification as a whole.

The invention claimed is:

1. A system for generating both power and steam for a hydrocarbon recovery operation, the hydrocarbon recovery operation configured to inject the steam downhole into a subsurface reservoir, the system comprising:

at least one combustor configured to combust a fuel gas and oxygen in a carbon dioxide working fluid to generate combustion products at a temperature exceeding a turbine operational target temperature, the combustion products comprising the carbon dioxide working fluid and water;

a fuel gas supply subsystem configured to supply the fuel gas to the at least one combustor;

an oxygen supply subsystem configured to supply the oxygen to the at least one combustor;

a turbine configured to receive the combustion products at the temperature exceeding the turbine operational target temperature from the at least one combustor to (i) convert heat up to but not exceeding that represented by the turbine operational target temperature to generate the power for powering the hydrocarbon recovery operation and (ii) generate a turbine output stream, the turbine output stream comprising excess heat unconvertible by the turbine;

at least one first recuperator configured to i) receive the turbine output stream comprising the excess heat and extract first extracted heat therefrom to form a first recuperator output stream comprising reduced excess heat, and ii) receive a feedwater from a feedwater supply subsystem for heating thereof using the first extracted heat to generate wet steam from the feedwater;

at least one second recuperator configured to receive the first recuperator output stream comprising the reduced excess heat and extract second extracted heat therefrom to form a second recuperator output stream;

a water extractor configured to receive the second recuperator output stream and extract the water therefrom leaving the carbon dioxide working fluid for supply to a first compressor configured to receive and compress the carbon dioxide working fluid, the at least one second recuperator further configured to receive compressed carbon dioxide working fluid produced from output of the first compressor for heating thereof using the second extracted heat to heat the compressed carbon dioxide working fluid for supply to the at least one combustor; and a steam injection subsystem configured to receive the wet steam generated by the at least one first recuperator for use in injecting steam downhole into the subsurface reservoir.

2. The system of claim 1, wherein:
the at least one combustor is two combustors arranged in series.

3. The system of claim 1, wherein:
the at least one combustor is two combustors arranged in parallel.

4. The system of claim 1, wherein:
the fuel gas is natural gas.

5. The system of claim 1, wherein:
the oxygen supply subsystem comprises an air supply, an air compressor for compressing air received from the air supply to form compressed air, an air separation unit for receiving the compressed air to extract oxygen therefrom, and an oxygen compressor for compressing the oxygen for supply to the at least one combustor.

6. The system of claim 1, wherein:
the at least one second recuperator is two recuperators arranged in series, wherein at least one of the two recuperators is further configured to heat the oxygen before supply to the at least one combustor.

7. The system of claim 1, wherein:
the water extractor is further configured to cool the carbon dioxide working fluid while extracting the water.

8. The system of claim 1, wherein:
a portion of the compressed carbon dioxide working fluid produced by the first compressor is redirected from the first compressor for mixing with the oxygen for supply to the at least one combustor.

9. The system of claim 1, wherein:
a portion of the compressed carbon dioxide working fluid produced by the first compressor is redirected from the first compressor for mixing with the oxygen for supply to the at least one first recuperator and to the at least one combustor thereby preheating the compressed carbon dioxide working fluid and the oxygen with the first extracted heat.

10. A method for generating power and steam for a hydrocarbon recovery operation, the method comprising:
a. providing a fuel gas and oxygen;
b. providing a carbon dioxide working fluid;
c. combusting the fuel gas and the oxygen in the carbon dioxide working fluid in at least one combustor to generate combustion products comprising the carbon dioxide working fluid and water;
d. using a turbine to generate the power from the combustion products;
e. extracting first heat from a turbine output stream;
f. extracting second heat from the turbine output stream;
g. extracting the water from the turbine output stream leaving the carbon dioxide working fluid;
h. compressing the carbon dioxide working fluid after extraction of the water and heating the compressed carbon dioxide working fluid with the second heat extracted from the turbine output stream for use in combustion of the fuel and the oxygen in the at least one combustor;
i. heating a feedwater with the first heat extracted from the turbine output stream to generate wet steam from the feedwater; and
j. using the wet steam to inject steam downhole into a subsurface reservoir.

11. The method of claim 10, wherein:
the at least one combustor is at least two combustors arranged in series.

12. The method of claim 10, wherein:
the at least one combustor is at least two combustors and comprising arranging the at least two combustors in parallel.

13. The method of claim 10, wherein:
the providing of the oxygen in step a. further comprises compressing air to form compressed air, extracting the oxygen from the compressed air, and compressing the oxygen for providing the oxygen to the at least one combustor.

14. The method of claim 10, wherein:
at least one first recuperator is used for the step of the extracting the first extracted heat and at least one second recuperator is used for the step of extracting the second extracted heat, the at least one first recuperator and the at least one second recuperator arranged in series.

15. The method of claim 14, wherein:
the at least one first recuperator is used to heat the oxygen before combustion in the at least one combustor.

16. The method of claim 10, wherein:
the carbon dioxide working fluid is cooled as the water is extracted.

17. The method of claim 10, further comprising:
after the compressing of the carbon dioxide working fluid, redirecting a portion of the compressed carbon dioxide working fluid and mixing the compressed carbon dioxide working fluid with the oxygen before combustion by the at least one combustor.

18. The method of claim 10, further comprising:
after the compressing of the carbon dioxide working fluid, redirecting a portion of the compressed carbon dioxide working fluid and mixing the compressed carbon dioxide working fluid with the oxygen, and heating the compressed carbon dioxide working fluid and the oxygen, before combustion by the at least one combustor.

* * * * *